United States Patent Office 3,494,886
Patented Feb. 10, 1970

3,494,886
POLYESTER COMPOSITIONS STABILIZED WITH SUBSTITUTED PHENOTHIAZINES
Clarence E. Tholstrup and John W. Thompson, Kingsport, Tenn., assignors to Eastman Kodak Company, Rochester, N.Y., a corporation of New Jersey
No Drawing. Filed Jan. 5, 1968, Ser. No. 695,859
Int. Cl. C08g 51/60
U.S. Cl. 260—45.8        16 Claims

ABSTRACT OF THE DISCLOSURE

Polyesters derived from aliphatic and cyclo-aliphatic dihydroxy compounds which are stabilized against oxidative deterioration at elevated temperatures with substituted phenothiazines.

This invention relates to the use of substituted phenothiazines as stabilizers for polyester polymers derived from aliphatic and cyclo-aliphatic dihydroxy compounds.

Briefly described, it has been found that polyester polymers derived from aliphatic and cyclo-aliphatic dihydroxy compounds may be effectively stabilized against oxidation at high temperatures by incorporating therein a stabilizing amount of at least one substituted phenothiazine having the following formula:

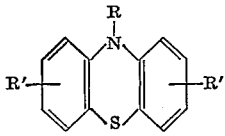

wherein R is hydrogen, a straight or branched chain alkyl radical having 1 to 30 carbon atoms (preferably 1 to 18 carbon atoms), or an alkylthioalkyl radical wherein the total carbon atom content is from 2 to 18; each R' independently is hydrogen, a straight or branched chain alkyl radical having 1 to 30 carbon atoms (preferably 4 to 18 carbon atoms), an —NHX radical wherein X can be $C_1$–$C_{18}$ alkyl, phenyl or substituted phenyl, an —SY radical wherein Y is an alkyl radical having 1 to 16 carbon atoms, or an alkylthioalkyl radical wherein the total carbon atom content is from 2 to 18; and at least one R or R' is other than hydrogen.

Some examples of suitable alkyl radicals include methyl, ethyl, isobutyl, heptyl, octyl, decyl, dodecyl, 1-methylpentadecyl, 1-methylheptadecyl, octadecyl, and the like.

Suitable alkylthioalkyl radicals include methylthiomethyl, methylthiopropyl, ethylthiobutyl, octylthiodecyl, pentylthiopropyl, and the like. Other radicals of this type will be apparent to those skilled in the art.

Those —NHX radicals which may be present include methylamino, ethylamino, hexylamino, dodecylamino, phenylamino, 2-methylphenylamino, 2,3-dimethylphenylamino, 4-hydroxyphenylamino, and the like.

The —SY radical may include thiomethyl, thiobutyl, thiooctyl, thiododecyl, and the like.

While the invention broadly includes compounds having R' groups at random positions on each side of the molecule it is preferred that the R' groups be in the 3,7 position.

A particularly effective group includes the alkyl-substituted phenothiazines having the following general formula:

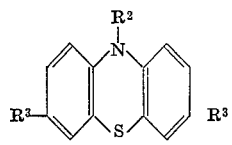

wherein $R^2$ is hydrogen or a branched or straight chain alkyl radical having 1 to 18 carbon atoms; each $R^3$ independently is hydrogen or a branched or straight chain alkyl radical having 4 to 18 carbon atoms; and at least one $R^2$ or $R^3$ is other than hydrogen.

Some examples of these alkyl-substituted phenothiazines are as follows:

N-methyl-phenothiazine
N-ethyl-phenothiazine
N-t.-butyl-phenothiazine
N-(1-methylheptyl)-phenothiazine
N-dodecyl-phenothiazine
N-(1-methylheptadecyl)-phenothiazine
N-octyldecyl-phenothiazine
1-butyl-phenothiazine
1-butyl-9-octyl-phenothiazine
1-butyl-7-dodecylphenothiazine
2-octyl phenothiazine
2-heptadecyl-6-butyl-phenothiazine
2-t.-butyl-8-octyl-phenothiazine
7-octyl-phenothiazine
3-hexyl-7-heptyl-phenothiazine
9-butyl-phenothiazine
3-(1-methylheptadecyl)-9-butyl-phenothiazine
8-octyl-phenothiazine
2-pentyl-7-(1-methylpentyl)-phenothiazine
2,8-dibutyl-phenothiazine
3,7-di(1,1,3,3-tetramethylbutyl)-phenothiazine
3,7-didodecyl-phenothiazine
3,7-dioctyl-phenothiazine
3,7-di(t.butyl)-phenothiazine
N-ethyl-3,7-di(1,1,3,3-tetramethylbutyl)-phenothiazine
N-dodecyl-3,7-di(octyl)-phenothiazine
N-octyldecyl-3,7-di(1-methylpentyl)-phenothiazine
N-dodecyl-3,7-di(1,1,3,3-tetramethylbutyl)-phenothiazine
N-t.butyl-2-butyl-7-octyl-phenothiazine
N-octyl-2-butyl-8-dodecyl-phenothiazine
N-decyl-1,9-dibutyl-phenothiazine Preparation of the above substituted phenothiazines may generally be accomplished in one or two steps depending on whether or not a substituent is desired in the N- position. Where no substituent in the N- position is desired the preparation merely involves reacting the corresponding substituted diphenylamine with sulfur. When a substituent is desired in the N- position the product obtained from the above reaction is further reacted with a trisubstituted phosphate; in the case of an alkyl substituent a trialkyl phosphate may be used. Another method for obtaining a substituent in the N- position is by reacting the sodium derivative of the phenothiazine compound obtained in the above reaction with the corresponding halogenated substituent, such as an alkyl halide.

The following examples will serve to further describe the preparation of these compounds.

EXAMPLE 1

Sulfur is reacted with 4,4'-bis(1,1,3,3-tetramethylbutyl)-diphenylamine to yield 3,7-bis(1,1,3,3-tetramethylbutyl)-phenothiazine. This product is thereafter reacted with triethyl phosphate to give N-ethyl-3,7-bis(1,1,3,3-tetramethylbutyl)phenothiazine having a melting point in the range of 103–104.5° C.

EXAMPLE 2

The sodium derivative of 3,7-bis(1,1,3,3-tetramethylbutyl)phenothiazine is reacted with dodecyl bromide to yield N - dodecyl-3,7-bis(1,1,3,3-tetramethylbutyl)phenothiazine having a melting point in the range of 45–47° C.

Any polyester derived from difunctional aliphatic and cyclo-aliphatic dihydroxy compounds can be effectively stabilized with the above-described substituted phenothiazines. In particular, these polyesters are highly polymeric, linear, condensation polymers derived from at least one difunctional dicarboxylic acid and at least one difunctional aliphatic or cyclo-aliphatic diol. They can range in inherent viscosity from about .5 to about 1.5 (I.V., determined in 60/40 wt./wt. phenol/tetrachloroethane mixture). Polyesters of this type may be prepared in accordance with conventional techniques such as described in Condensation Polymers (Interscience), 1965, by Paul W. Morgan.

The difunctional aliphatic and cyclo-aliphatic dihydroxy compounds from which these polyesters are derived include the following compounds: ethylene glycol; diethylene glycol; 1,2-propylene glycol; 2,4-dimethyl-2-ethyl-1,3 - hexanediol; 2,2,4-trimethyl-1,3-pentanediol; 2,2-dimethyl - 1,3 - propanediol; 1,3-butanediol; 1,4-butanediol; 1,4-butenediol; 1,5-pentanediol; 1,6-hexanediol; 1,10-decanediol; 2,2,4-trimethyl-1,6-hexanediol; 1,4-cyclohexanediol; 1,2-cyclohexanedimethanol; 1,3-cyclohexanedimethanol; 1,4-cyclohexanedimethanol; and 2,2,4,4-tetramethyl-1,3-cyclobutanediol. Other aliphatic and cyclo-aliphatic dihydroxy compounds which can also be used will be apparent to those skilled in the art.

Examples of suitable difunctional dicarboxylic acids include oxalic; malonic; dimethylmalonic; succinic; glutaric; adipic; 3-methyl adipic; trimethyl adipic; pimelic; 2,2-dimethylglutaric; 3,3-diethylsuccinic; azelaic; sebacic; suberic; 1,2-cyclopentanedicarboxylic; 1,3-cyclopentanedicarboxylic; 1,2-cyclohexanedicarboxylic; 1,3-cyclohexanedicarboxylic; 1,4-cyclohexanedicarboxylic; 1,4-cyclohexenedicarboxylic; phthalic; terephthalic; isophthalic; 4-methylisophthalic; t-butyl isophthalic; 2,5-norbornanedicarboxylic; 2,5-norbornenedicarboxylic; 1,4-naphthalic; diphenic; 4,4'-oxydibenzoic; 4,4'-methylenedibenzoic; diglycolic; thiodipropionic; 4,4'-sulfonyldibenzoic; 2,5-naphthalene dicarboxylic; 2,6-naphthalene dicarboxylic; and 2,7-naphthalene dicarboxylic acids. It will be understood that the corresponding acid anhydrides, esters, and acid chlorides of these acids are included in the term "dicarboxylic acid." Preferred among these derivatives are the esters, examples of which include dimethyl 1,4-cyclohexanedicarboxylate; dimethyl 2,6-naphthalendicarboxylate; dimethyl 4,4'-sulfonyldibenzoate; dimethyl isophthalate; dimethyl terephthalate; and diphenyl terephthalate.

It will be understood that the term "polyester" as used herein includes homopolyesters and copolyesters. These polymers may be prepared using two or more dihydroxy compounds and/or two or more acid reactants.

Some specific examples of these polyesters include poly(ethyleneterephthalate), poly(1,4-cyclohexylenedimethyleneterephthalate), the polyester of a mixture of 95% terephthalic and 5% isophthalic acids with 1,4-cyclohexanedimethanol, and the polyester of terephthalic acid with a mixture of 80 mol percent ethylene glycol and 20 mole percent 1,4-cyclohexanedimethanol.

The substituted phenothiazine antioxidants may be incorporated into the above-described polyesters in a conventional manner either as is or as concentrates or in solvent solutions. Such conventional techniques include milling on heated rolls, solvent-coating, melt blending, or blending the powdered ingredients.

A stabilizing amount of the antioxidant is employed and may vary depending on the specific antioxidant compound and polymer employed as well as the ultimate use of the stabilized resin. Generally, an amount in the range of about 0.05–5.0% by weight based on the polymer may be used, although 0.25–2.0% by weight based on the polymer is effective for most applications.

Other additives may also be incorporated into the polymer, either before, during, or after the incorporation of the antioxidant. These additives include various fillers ($TiO_2$, asbestos, talc, glass fiber, etc.), pigments, carbon black, UV inhibitors, additional antioxidants, antistatic agents, antisoil agents, physical or electrical property improvers, dyes, fire retardants, and the like.

The following examples will serve to further illustrate the invention.

EXAMPLE 3

A sample control film is prepared by pressing a 10-mil film from granules of poly(1,4-cyclohexylenedimethyleneterephthalate) using a modified Hannifin press having electrically heated platens.

EXAMPLES 4–5

Additional 10-mil test sample films of poly(1,4-cyclohexylenedimethyleneterephthalate) containing the indicated amount of the following antioxidant are prepared in the same manner as described in Example 3. The antioxidant in each case is applied to the polyester using a solvent coating technique. Specifically, in each instance, the required amount of antioxidant is dissolved in 30 ml. acetone and the solution is added to 100 g. of the granulated polyester in a flask. The flask and its contents are rotated over a steam bath until essentially all the acetone is evaporated. The resulting polyester, coated with antioxidant, is dried for 16 hours in a vacuum oven at 120° C. prior to forming the sample films.

TABLE 1

| Example No. | Wt. percent Based on Polyester | Antioxidant |
|---|---|---|
| 4 | 0.5 | N-ethyl-3,7-bis (1,1,3,3-tetramethylbutyl) phenothiazine. |
| 5 | 0.25 | 3,7-bis(1,1,3,3-tetramethylbutyl) phenothiazine. |

EXAMPLE 6

The sample films prepared as described in Examples 3–5 are tested for stability at elevated temperatures by suspending them in a forced air oven maintained at 200° C. and periodically testing them for brittleness and inherent viscosity. Brittleness is determined by flexing the aged sample films through 180° and checking for fractures. Inherent viscosity is measured in 60/40 phenol/tetrachlorethane mixture at 100° C. The results of the tests are as follows:

TABLE II

| Film of Example No. | Initial I.V. of Film | Film Life at 200° C. | |
|---|---|---|---|
| | | Time (Hrs.) to Reach 0.70 I.V. | Time (Hrs.) to Brittleness |
| 3 | 0.76 | 14 | 3 |
| 4 | 0.76 | 27 | 10 |
| 5 | 0.75 | 16 | 10 |

The results of the above tests demonstrate that the substituted phenothiazines provide superior film life for the polyester.

EXAMPLE 7

Using the same procedures described in Examples 3–5, Sample 10-mil films are formed from poly(ethyleneterephthalate) containing 0.5% $TiO_2$.

One film contains no antioxidants and serves as a control while the other film has incorporated therein 0.5% N-ethyl-3,7 - bis(1,1,3,3 - tetramethylbutyl)phenothiazine. These films are tested in the same manner as those in Example 6 with the following results:

TABLE III

| Sample Film | Initial I.V. of Film | Film Life at 200° C. | |
|---|---|---|---|
| | | Time (Hrs.) to Reach 0.70 I.V. | Time (Hrs.) to Brittleness |
| Control | 0.90 | 15 | 15 |
| Stabilized Film | 0.85 | 45 | 48 |

The results again demonstrate the outstanding effectiveness of the substituted phenothiazines as antioxidants for polyesters derived from aliphatic and cyclic-aliphatic dihydroxy compounds.

EXAMPLE 8

In accordance with the procedures set forth in Examples 3–5, sample films were prepared of the polyester of a mixture of ethylene glycol and 1,4-cyclohexanedimethanol (80/20 molar ratio) and terephthalic acid. A sample designated A contained no antioxidant and served as a control. A sample designated B has 1.0% N-ethyl-3,7-bis(1,1,3,3-tetramethylbutyl)phenothiazine incorporated therein and a sample designated C has 1.0% 3.7-bis(1,1,3,3-tetramethylbutyl)phenothiazine incorporated therein, each in accordance with the solvent-coating technique. The test results on these films are as follows:

TABLE IV

| Sample Film | Initial I.V. of Film | Film Life at 200° C. | |
|---|---|---|---|
| | | Time (Hrs.) to Reach 0.60 I.V. | Time (Hrs.) to Brittleness |
| A | 0.74 | 3 | 1.5 |
| B | 0.71 | 14 | 7 |
| C | 0.73 | >36 | 38 |

Again the superior antioxidant function of the substituted phenothiazines in the polyesters is demonstrated. In addition to the above results the samples designated B and C exhibited less color change than sample A.

EXAMPLE 9

Using the procedures set forth hereinabove, sample films of poly(1,4-butylene - trans - 1,4 - cyclohexanedicarboxylate) having an I.V. of 1.13 and a polyester of ethylene glycol and a mixture of terephthalic acid and isophthalic acid (molar ratio 95/5) having an I.V. of 0.87, respectively, are found to be effectively stabilized when containing 0.5% by weight of N-ethyl-3,7-di-tert.-butyl-phenothiazine.

The stabilized thermoplastic compositions of this invention may be formed, by extrusion or molding, into films, fibers, sheets, tubes, rods, and other shaped articles.

Thus, having described the invention in detail, it will be understood that certain variations and modifications may be effected without departing from the spirit and scope of the invention as disclosed herein and defined in the appended claims.

We claim:

1. A thermoplastic composition stabilized against oxidative degradation at elevated temperatures comprising:
    (A) at least one polyester derived from difunctional aliphatic and cycloaliphatic dihydroxy compounds and difunctional dicarboxylic acids, and
    (B) a stabilizing amount of at least one alkyl-substituted phenothiazine having the following formula

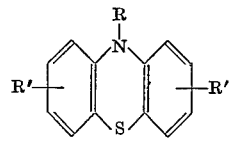

wherein R is hydrogen, a straight or branched chain alkyl radical having 1 to 30 carbon atoms, or an alkylthioalkyl radical wherein the total carbon atom content is from 2 to 18; each R' independently is hydrogen, a straight or branched chain alkyl radical having 1 to 30 carbon atoms, an —SY radical wherein Y is an alkyl radical having 1 to 18 carbon atoms, or an alkylthioalkyl radical wherein the total carbon atom content is from 2 to 18; and at least one R or R' is other than hydrogen.

2. A thermoplastic composition according to claim 1 wherein the polyester is poly(1,4-cyclohexylenedimethyleneterephthalate) and the substituted phenothiazine is an N-3,7-trialkyl-phenothiazine.

3. A thermoplastic composition according to claim 1 wherein the polyester is derived from a mixture of ethylene glycol and 1,4-cyclohexanedimethanol and terephthalic acid and the substituted phenothiazine is an N-3,7-trialkyl-phenothiazine.

4. A thermoplastic composition according to claim 1 wherein the polyester is poly(ethyleneterephthalate) and the substituted phenothiazine is an N-3,7-trialkyl-phenothiazine.

5. A thermoplastic composition according to claim 1 wherein the polyester is derived from ethylene glycol and mixed isophthalic and terephthalic acids and the substituted phenothiazine is an N-3,7-trialkyl-phenothiazine.

6. A thermoplastic composition according to claim 1 wherein the substituted phenothiazine is a 3,7-bis-alkyl-phenothiazine.

7. A thermoplastic composition stabilized against oxidative degradation at elevated temperatures comprising:
    (A) at least one polyester derived from difunctional aliphatic and cyclo-aliphatic dihydroxy compounds and difunctional dicarboxylic acids, and
    (B) a stabilizing amount of at least one alkyl-substituted phenothiazine having the following formula

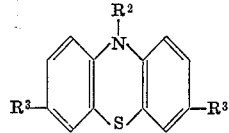

wherein $R^2$ is hydrogen or a branched or straight chain alkyl radical having 1 to 18 carbon atoms, each $R^3$ independently is hydrogen or a branched or straight chain alkyl radical having 4 to 18 carbon atoms, and at least one $R^2$ or $R^3$ is other than hydrogen.

8. A thermoplastic composition according to claim 7 wherein the polyester is poly(1,4-cyclohexylenedimethyleneterphthalate).

9. A thermoplastic composition according to claim 7 wherein the polyester is poly(ethyleneterephthalate).

10. A thermoplastic composition according to claim 7 wherein the polyester is derived from a mixture of ethylene glycol and 1,4-cyclohexanedimethanol and terephthalic acid.

11. A thermoplastic composition according to claim 7 wherein the polyester is derived from ethylene glycol and mixed isophthalic and terephthalic acids.

12. A thermoplastic composition according to claim 7 wherein $R^2$ and each $R^3$ are alkyl radicals as defined therein.

13. A thermoplastic composition according to claim 7 wherein each $R^3$ is a 1,1,3,3-tetramethylbutyl radical.

14. A thermoplastic composition according to claim 13 wherein $R^2$ is an ethyl radical.

15. A thermoplastic composition according to claim 13 wherein $R^2$ is hydrogen.

16. Shaped articles formed from the composition of claim 7.

References Cited

UNITED STATES PATENTS

| | | | |
|---|---|---|---|
| 2,998,405 | 8/1961 | Weldy | 260—45.8 |
| 3,014,888 | 12/1961 | Shimmin et al. | 260—45.8 |
| 3,097,100 | 7/1963 | Lappin et al. | 106—176 |
| 3,364,170 | 1/1968 | Savides | 260—45.8 |
| 3,389,124 | 6/1968 | Sparks | 252—51.5 |

DONALD E. CZAJA, Primary Examiner

R. A. WHITE, Assistant Examiner

U.S. Cl. X.R.

260—40